Aug. 29, 1933.  C. RINGWALD  1,924,415
ELECTRICAL CONTACT
Filed Aug. 28, 1931
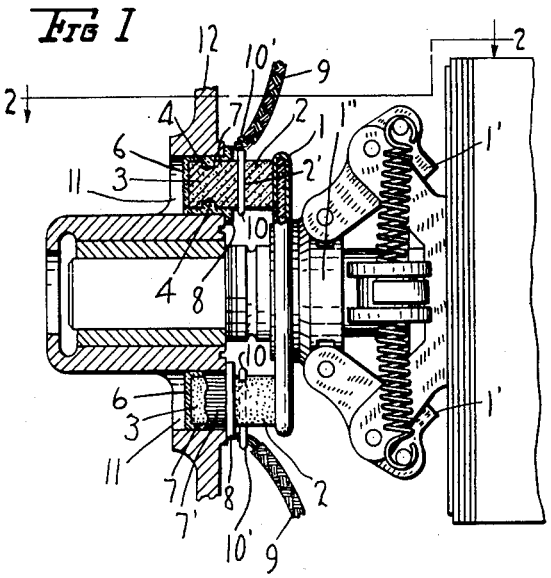
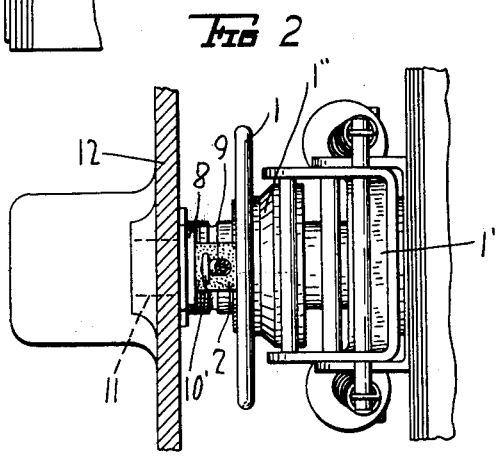
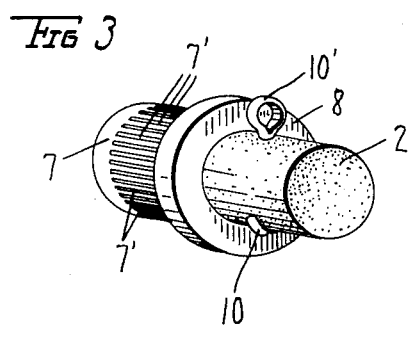
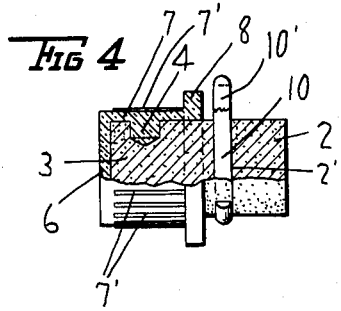
INVENTOR
Clarence Ringwald
BY Staley & Welch
ATTORNEYS Patented Aug. 29, 1933

1,924,415

UNITED STATES PATENT OFFICE 1,924,415

ELECTRICAL CONTACT

Clarence Ringwald, North Hampton, Ohio, assignor to Robbins & Myers, Inc., Springfield, Ohio, a corporation of Ohio Application August 28, 1931. Serial No. 559,954

4 Claims. (Cl. 200—166)

This invention relates to electrical contacts, it more particularly relating to means for mounting a carbon brush and conducting the current to or from the same.

The object of my invention is to provide a simple and inexpensive means for mounting a carbon brush at the desired place of installation and of connecting an electrical conductor therewith.

In the accompanying drawing:

Fig. 1 is a view partly in elevation and partly in vertical section of a cut-out for electric motors shown equipped with my improved contact.

Fig. 2 is a fragmentary horizontal section on the line 2—2 of Fig. 1.

Fig. 3 is an enlarged view in perspective of the contact brush and associated parts.

Fig. 4 is a view partly in elevation and partly in longitudinal section of the same.

Referring to the drawing, in Figs. 1 and 2 there is shown a centrifugally-operated circuit breaker to which the invention is shown applied in which 1 is a metallic disk which is normally held in contact with the brushes 2 when the member is at rest, this disk being withdrawn from the brushes at a given speed of the motor by the centrifugally operated weights 1' which have an engagement with the axially movable sleeve 1" mounted on the motor shaft and upon which the disk 1 is rotatably mounted; the brushes 2 forming a part of the circuit of the starting coil (not shown).

Each of the brushes, which are of the pressed granular carbon type, is provided with a shank of suitable insulating material of a kind which may be moulded about one end of the brush so as to form a fixed part thereof. Bakelite is preferably employed for the purpose and in the moulding operation the end 3 of the brush is preferably notched or scored in any suitable manner, as shown at 4 to receive the bakelite so that a firm connection may be made between the parts. The bakelite shank is formed with a sleeve portion 7, a closed end 6 and a flange 8. An electrical conductor or lead 9 is connected with each brush by soldering the end thereof to the eye 10' of a split cotter pin 10 which is inserted through an aperture 2' in the exposed portion of the brush.

Each shank is inserted in an aperture 11 formed in the motor head 12 in the present case, the exterior of the sleeve portion 7 being preferably knurled as indicated at 7' to provide for a tight fit in the opening.

By this method of forming the carbon brush with a moulded shank portion, the initial expense of manufacturing the brushes has been greatly reduced, while the assembly cost has also been lowered as in assembly it is only necessary to provide suitable drilled or machined openings to receive the brushes and their shanks. Also, the means for securing the leads to the brushes results in a saving in cost, it being only necessary to solder the end of the lead to the eye of an ordinary cotter pin, and insert the cotter pin through the drilled opening in the brush and clinch the same to the brush.

Having thus described my invention, I claim:

1. In an electrical contact, a carbon brush, a shank of insulating material secured to a portion thereof as a permanent unitary part thereof, and means for securing a conductor to the exposed portion of said brush.

2. In an electrical contact, a carbon brush, a shank of insulating material secured to a portion thereof as a permanent unitary part thereof, a flange on the inner end of said shank, and means for securing an electrical conductor to the exposed portion of said brush.

3. In an electrical contact, a cylindrical carbon brush, a cylindrical shank of insulating material secured to one end thereof as a permanent unitary part thereof, a flange on the inner end of said shank, a member having an aperture to receive said shank, and means for securing an electrical conductor to the exposed portion of said brush.

4. In an electrical contact, a carbon brush, a shank of insulating material moulded onto a portion of said brush so as to constitute a permanent unitary part thereof, said brush and shank having inter-engaging parts, and means for securing an electrical conductor to the exposed portion of said brush.

CLARENCE RINGWALD.